(12) United States Patent
Huang et al.

(10) Patent No.: US 12,520,612 B2
(45) Date of Patent: Jan. 6, 2026

(54) TRANSISTOR AND PHOTOELECTRIC SENSOR

(71) Applicant: Shanghai Tianma Microelectronics Co., Ltd., Shanghai (CN)

(72) Inventors: Yukun Huang, Shanghai (CN); Linzhi Wang, Shanghai (CN); Kerui Xi, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 650 days.

(21) Appl. No.: 17/966,368

(22) Filed: Oct. 14, 2022

(65) Prior Publication Data

US 2024/0006433 A1 Jan. 4, 2024

(30) Foreign Application Priority Data

Jun. 30, 2022 (CN) .......................... 202210771365.9

(51) Int. Cl.
| H10F 39/00 | (2025.01) |
| H10D 62/10 | (2025.01) |
| H10D 86/40 | (2025.01) |

(52) U.S. Cl.
CPC ....... *H10F 39/80377* (2025.01); *H10D 62/10* (2025.01); *H10D 86/427* (2025.01); *H10F 39/80373* (2025.01)

(58) Field of Classification Search
CPC .. H10D 62/10; H10D 86/427; H10F 39/8037; H10F 39/80373; H10F 39/80377
See application file for complete search history.

(56) References Cited

U.S. PATENT DOCUMENTS

| 2011/0273390 | A1* | 11/2011 | Nakatsuji | ............... | H10D 86/40 |
| | | | | | 438/479 |
| 2012/0032154 | A1* | 2/2012 | Katsuhara | ............ | H10K 10/484 |
| | | | | | 257/40 |
| 2013/0200361 | A1* | 8/2013 | Tsang | ................. | H10D 30/6757 |
| | | | | | 257/E29.296 |
| 2020/0273995 | A1* | 8/2020 | Song | ....................... | H10D 86/60 |

FOREIGN PATENT DOCUMENTS

| CN | 102473792 | A | | 5/2012 | |
| CN | 103762251 | A | | 4/2014 | |
| CN | 205723551 | | | 11/2016 | |
| CN | 111584675 | A | | 8/2020 | |
| JP | 2007519250 | A | * | 7/2007 | ......... H10D 30/6743 |
| JP | 2009099605 | A | * | 5/2009 | |
| WO | WO-2011161910 | A1 | * | 12/2011 | ......... H10D 86/0231 |
| WO | WO-2019135731 | A1 | * | 7/2019 | ............. H10D 86/60 |

* cited by examiner

*Primary Examiner* — Matthew E Warren
(74) *Attorney, Agent, or Firm* — KDW FIRM PLLC

(57) ABSTRACT

Provided are a transistor and a photoelectric sensor, the transistor includes a substrate and an active layer located on a side of the substrate; the active layer includes a source region, a drain region and a channel region located between the source region and the drain region, and in the channel region, the active layer includes a first active portion, a second active portion and a third active portion, the second active portion and the third active portion are respectively located on two opposite sides of the first active portion in a first direction, the second active portion is communicated with the source region in the active layer, and the third active portion is communicated with the drain region in the active layer.

19 Claims, 8 Drawing Sheets

TRANSISTOR AND PHOTOELECTRIC SENSOR

CROSS-REFERENCE TO RELATED APPLICATION(S)

This application claims priority to Chinese Patent Application No. 202210771365.9 filed Jun. 30, 2022, the disclosure of which is incorporated herein by reference in its entirety.

TECHNICAL FIELD

The present disclosure relates to the technical field of semiconductor devices and, in particular, to a transistor and a photoelectric sensor.

BACKGROUND

At present, photoelectric sensors are widely applied to multiple fields such as a consumer electronic, a communication device, an industrial control and an intelligent instrument. For example, as an input apparatus for each device, the display device may be integrated with a touch function by providing multiple photoelectric sensors. The photoelectric sensors may, for example, be a phototransistor, i.e. a transistor applied for a photoelectric sensing.

The transistor is a semiconductor device including an active layer (semiconductor layer) and electrodes such as a gate, a source and a drain, and when an energy of a single photon of incident light is greater than a band gap of a semiconductor material, the semiconductor material will absorb the photon energy and generate an electron-hole pair to increase the concentration of carriers. As such, when the transistor is controlled by gate-source bias to be in an on state (turned-on state), if the semiconductor layer is not illuminated, a current of the transistor is relatively small and is a dark current, if the semiconductor layer is illuminated, the current of the transistor is obviously increased and is bright current, and a difference between the bright current and the dark current is photocurrent. The illumination intensity is the larger, the photocurrent is the larger, so that the illumination intensity may be sensed through the photocurrent, and the application of photoelectric sensing such as a light sensing and a light control is realized.

However, an active layer of an existing transistor is usually a planar active layer, and when the transistor is applied to the application of the photoelectric sensing, the electrical performance and the photoelectric induction capability of the transistor cannot be considered at the same time.

SUMMARY

The present disclosure provides a transistor and a photoelectric sensor, so as to improve the absorption capability of the transistor to incident light and improve the photoelectric induction capability of the transistor while ensuring the performance of the transistor.

According to an aspect of the present disclosure, a transistor is provided. The transistor includes a substrate and an active layer located on a side of the substrate. The active layer includes a source region, a drain region and a channel region located between the source region and the drain region. In the channel region, the active layer includes a first active portion, a second active portion and a third active portion, the second active portion and the third active portion are respectively located on two opposite sides of the first active portion in a first direction, the second active portion is communicated with the source region in the active layer, and the third active portion is communicated with the drain region in the active layer. A thickness of at least part of the first active portion in a second direction is greater than a thickness of the second active portion in the second direction and greater than a thickness of the third active portion in the second direction. The first direction is parallel to a direction in which the source region points to the drain region, and the second direction is perpendicular to a plane where the substrate is located.

According to another aspect of the present disclosure, a photoelectric sensor is provided. The photoelectric sensor includes the transistor provided in any of the embodiments of the present disclosure.

BRIEF DESCRIPTION OF DRAWINGS

In order to more clearly explain the technical schemes in embodiments of the present disclosure, the drawings used for describing the embodiments will be briefly introduced below. Obviously, the drawings in the following description are some embodiments of the present disclosure. For those of ordinary skill in the art, other drawings may also be obtained without creative labor according to these drawings.

DETAILED DESCRIPTION

Figure 1:
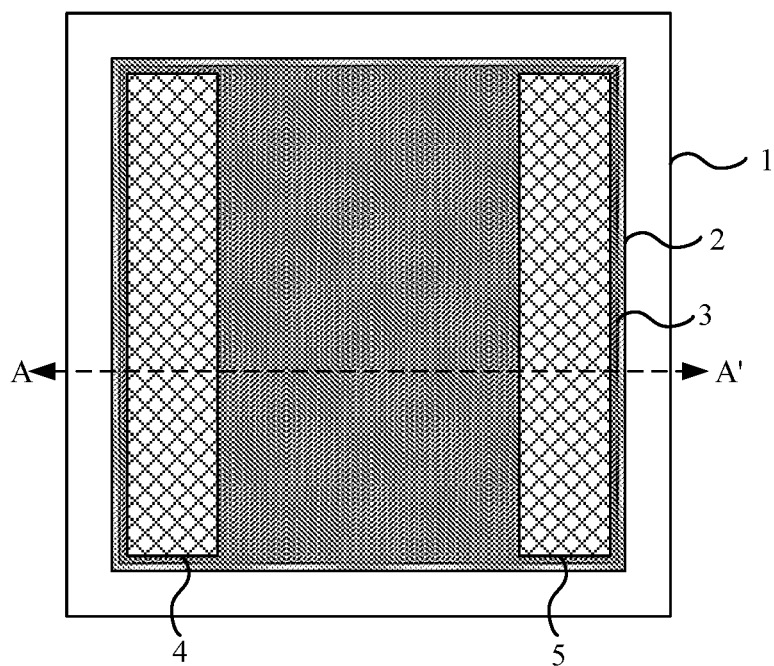
FIG. 1 is a top view of a transistor provided in an embodiment of the present disclosure.

In order to make those skilled in the art better understand the schemes of the present disclosure, the technical schemes in the embodiments of the present disclosure will be clearly and completely described below in conjunction with the drawings in the embodiments of the present disclosure, and it is obvious that the described embodiments are merely a part of the embodiments of the present disclosure, and not all of the embodiments. All other embodiments, which can be obtained by those of ordinary skill in the art without making any creative effort based on the embodiments in the present disclosure, shall fall within the protection scope of the present disclosure.

As described above, when an existing transistor having a planar active layer is used for the photoelectric sensing, both the electrical performance and the photoelectric induction capability of the transistor cannot be considered. Specifically, in the transistor, a gate has a modulation effect on the electrical performance of a channel region, and a vertical electric field may be created in the device through a gate-source bias ($V_{GS}$), so that interfaces of a gate insulating layer and an active layer (semiconductor layer) are coupled and carriers are accumulated to form a conductive channel; thus, a transition of the transistor from an off-state (i.e., a turned-off state) to an on-state (i.e., a turned-on state) is achieved, in which a thickness of the conductive channel is thin. When the transistor is applied to the photoelectric sensing, for the transistor with the planar active layer, if a thickness of the active layer is relatively thin, most incident light may penetrate through the active layer, so that the light absorption of the active layer is insufficient, and the photoelectric induction capability is reduced; if the thickness of the active layer is relatively thick, a field intensity in a vertical direction is weakened, and an acting force of the gate on carriers is weakened, when illumination is incident, a semiconductor material of the active layer absorbs electron hole pairs generated by photon energy, the electron hole pairs are not easily coupled to the interface of the gate insulating layer and the active layer, a back channel is easily formed, so that an off-state current of the transistor is increased, and a series of electrical performance degradation such as failure of normal turn-off of the transistor is caused.

In order to solve the problem, an embodiment of the present disclosure provides a phototransistor, the phototransistor includes a substrate and an active layer located on a side of the substrate. The active layer includes a source region, a drain region and a channel region located between the source region and the drain region. In the channel region, the active layer includes a first active portion, a second active portion and a third active portion, the second active portion and the third active portion are respectively located on two opposite sides of the first active portion in a first direction, the second active portion is communicated with the source region in the active layer, and the third active portion is communicated with the drain region in the active layer. A thickness of at least part of the first active portion in a second direction is greater than a thickness of the second active portion in the second direction and greater than a thickness of the third active portion in the second direction. The first direction is parallel to a direction in which the source region points to the drain region, and the second direction is perpendicular to a plane where the substrate is located.

By adopting the above schemes, on one hand, a light distance of incident light in the channel region can be increased by utilizing the first active portion with a larger thickness, the residence time is prolonged, and further the absorption of light by the transistor is enhanced; on the other hand, the modulation effect of the gate electrode on the electrical performance of the channel region can be ensured by utilizing the second active portion and the third active portion with a thinner thickness, and the electrical performance of the transistor is ensured, so that the problem that an existing planar active layer cannot give consideration to both the electrical performance and the photoelectric induction capability of the transistor can be solved; the absorption of light by the transistor is enhanced and thus the photoelectric induction capability of the transistor is improved while ensuring the electrical performance of the transistor.

The above is the core idea of the present application, and based on the embodiments in the present application, all other embodiments obtained by those of ordinary skill in the art without creative work fall within the protection scope of the present application. The technical schemes in the embodiments of the present application will now be clearly and fully described in conjunction with the accompanying drawings in the embodiments of the present application.

Figure 2:
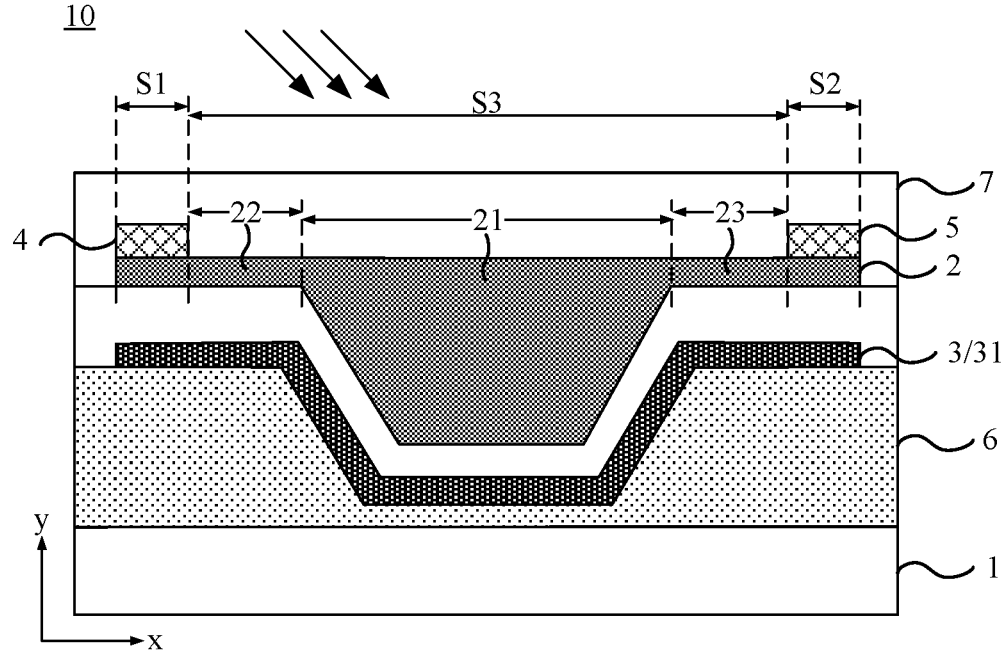
FIG. 2 is a cross-sectional view of the transistor taken along AA' in FIG. 1.

FIG. 1 is a top view of a transistor provided in an embodiment of the present disclosure; FIG. 2 is a cross-sectional view of the transistor taken along AA' in FIG. 1, and as shown in FIG. 1 and FIG. 2, a transistor 10 provided in the embodiment of the present disclosure includes a substrate 1 and an active layer 2 located on a side of the substrate 1; the active layer 2 includes a source region S1, a drain region S2 and a channel region S3 located between the source region S1 and the drain region S2. In the channel region S3, the active layer 2 includes a first active portion 21, a second active portion 22 and a third active portion 23, the second active portion 22 and the third active portion 23 are respectively located on two opposite sides of the first active portion 21 in a first direction x, the second active portion 22 is communicated with the source region S1 in the active layer, and the third active portion 23 is communicated with the drain region S2 in the active layer. A thickness of at least part of the first active portion 21 in a second direction y is greater than a thickness of the second active portion 22 in the second direction y and greater than a thickness of the third active portion 23 in the second direction y. The first direction x is parallel to a direction in which the source region S1 points to the drain region S2, and the second direction y is perpendicular to a plane where the substrate 1 is located.

The active layer 2 is composed of a semiconductor material, the transistor may be divided into different types according to different semiconductor materials. Exemplary, the semiconductor material includes an amorphous silicon (a-Si), a low-temperature poly-Si (LTPS), or an oxide semiconductor (such as, indium gallium zinc oxide (IGZO)), and the like.

As shown in FIG. 2, the transistor 10 further includes a gate electrode 3, a source electrode 4 and a drain electrode 5. The source electrode 4 is in contact with the source region S1 in the active layer 2, and the drain electrode 5 is in contact with the drain region S2 in the active layer 2, the gate electrode 3 is disposed to be insulated from the active layer 2 (an insulating layer therebetween is referred to as a gate insulating layer), and an orthographic projection of the gate electrode 3 on the substrate 1 overlaps an orthographic projection of the channel region S3 on the substrate 1. When a voltage is applied to the gate electrode 3, an electric field may be generated, so that induced charges are generated on a surface of the active layer 2 of the channel region S3, and when a gate voltage reaches a starting voltage, carriers may pass through the channel region S3 when the voltage is applied between the source electrode 4 and the drain electrode 5, so that the source region S1 and the drain region S2 are turned on, that is, the transistor is turned on. In addition, when the semiconductor material of the active layer is illuminated, photon energy may be absorbed and electron hole pairs may be generated, so that the concentration of carriers is increased, and therefore, when the transistor is turned on, a size of the light current may be determined through the current of the transistor, the illumination intensity is sensed, and the application of the transistor in the photoelectric sensing field is achieved.

As shown in FIG. 2, in this embodiment, in the channel region S3, the active layer 2 includes a first active portion 21, a second active portion 22 and a third active portion 23. The second active portion 22 and the third active portion 23 are respectively located on two opposite sides of the first active portion 21 in a first direction x, the second active portion 22 is communicated with the source region S1 in the active layer 2, and the third active portion 23 is communicated with the drain region S2 in the active layer 2. A thickness of at least part of the first active portion 21 in a second direction y is greater than a thickness of the second active portion 22 in the second direction y and greater than a thickness of the third active portion 23 in the second direction y. As such, on one hand, a light distance of incident light in the channel region S3 can be increased by utilizing the first active portion 21 with a larger thickness, the residence time is prolonged, and further the absorption of light by the transistor is enhanced. On the other hand, the modulation effect of the gate electrode 3 on the electrical performance of the channel region S3 can be ensured by utilizing the second active portion 22 and the third active portion 23 with a thinner thickness, and the electrical performance of the transistor is ensured. Specifically, since the second active portion 22 and the third active portion 23 are respectively located on two opposite sides of the first active portion 21, the second active portion 22 is communicated with the source region S1, and the third active portion 23 is communicated with the drain region S2, a transmission path of carriers in the channel region S3 is equivalent to the series connection of a region where the second active portion 22 is located, a region where the first active portion 21 is located and a region where the third active portion 23 is located, and as such, although the modulation effect of the gate electrode 3 on a region where the gate electrode 3 is located is reduced due to a fact that the thickness of at least part of the first active portion 21 in the second direction y is relatively thick, a back channel is formed, however, since the thickness of each of the second active portion 22 and the third active portion 23 in the second direction y is less than the thickness of at least part of the first active portion 21 in the second direction y, so that the gate electrode 3 still has enough modulation effect on the region where the second active portion 22 is located and the region where the third active portion 23 is located, whereby negative effects such as off-state current rise of the region where the first active portion 21 is located due to the back channel effect may be weakened. Therefore, carriers which are not regulated and controlled by the gate electrode 3 in the region where the first active portion 21 is located are regulated and controlled by the gate electrode 3 again before entering the source electrode 4 and the drain electrode 5, the normal turned-on and turned-off of the transistor are ensured, and thus the electrical performance of the transistor is ensured.

Figure 3:
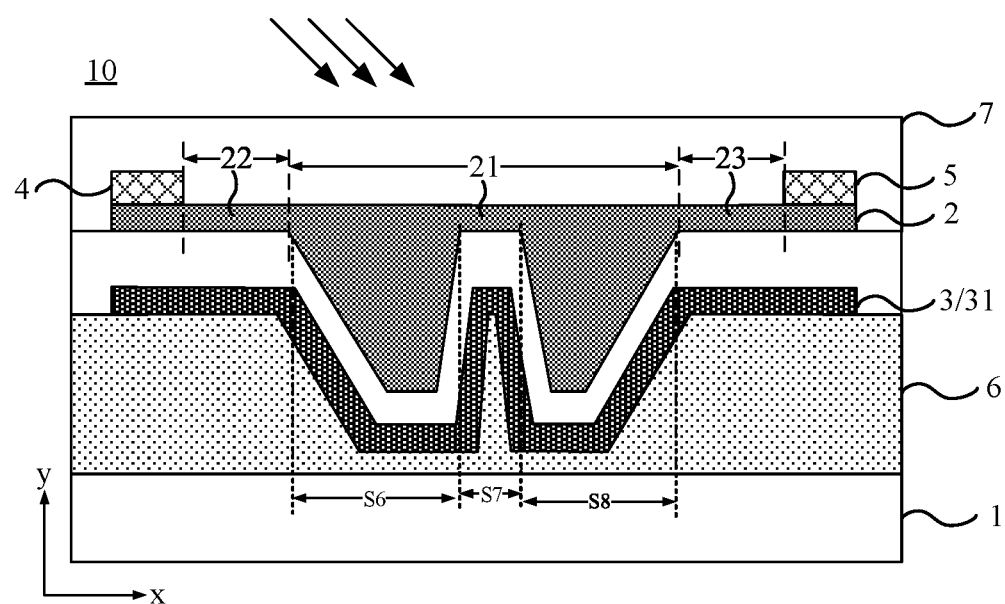
FIG. 3 is a cross-sectional view of another transistor provided in an embodiment of the present disclosure.

It should be noted that in FIG. 2, except for boundary positions between the first active portion 21 and the second active portion 22 as well as the third active portion 23 (the thicknesses between the first active portion 21 and the second active portion 22 as well as the third active portion 23 at this position are equal), in the first direction x, the thickness of each position of the first active portion 21 in the second direction y is greater than the thickness of the second active portion 22 in the second direction y, and meanwhile is greater than the thickness of the third active portion 23 in the second direction y, and this arrangement is merely illustrative and not limiting. FIG. 3 is a cross-sectional view of another transistor provided in an embodiment of the present disclosure, as shown in FIG. 3, in other embodiments, except for the boundary positions between the first active portion 21 and the second active portion 22 as well as the third active portion 23, in the first direction x, a thickness of a part of the first active portions 21 in the second direction y is greater than a thickness of the second active portions 22 in the second direction y and is greater than the thickness of the third active portions 23 in the second direction y, and a thickness of another part of the first active portions 21 in the second direction y is equal to the thickness of the second active portions 22 in the second direction y, and is equal to the thickness of the third active portion 23 in the second direction y. For example, in FIG. 3, in the first direction x, the thickness of the first active portion 21 in the second direction y at each position in the S6 and S8 regions is greater than the thickness of the second active portion 22 in the second direction y, and meanwhile is also greater than the thickness of the third active portion 23 in the second direction y, and the thickness of the first active portion 21 in the second direction y at each position in the S7 region is equal to the thickness of the second active portion 22 in the second direction y and is also equal to the thickness of the third active portion 23 in the second direction y. As such, the optical distance of part of incident light in the channel region S3 may also be increased, the residence time of the part of incident light in the channel region S3 may be prolonged, the absorption of light by the transistor is further increased, the photoelectric induction capability of the transistor is improved, and meanwhile, the modulation effect of the gate electrode on the electrical performance of the channel region S3 is ensured, and the electrical performance of the transistor is ensured, and the following description is only performed by using the former as an example.

Moreover, in this embodiment, the substrate 1 may be a flexible substrate and may be formed of any insulating material having flexibility; the substrate 1 may also be a rigid substrate, such as a glass substrate, which is not limited in the embodiments of the present disclosure. The gate electrode 3, the source electrode 4, and the drain electrode 5 may be metal electrodes that are opaque to light and have the effect of reflecting light, such as copper, aluminum, molybdenum, titanium, molybdenum-titanium alloy, or molybdenum-niobium alloy, or may be a conductive material that is opaque to light such as indium tin oxide, which is not limited in the embodiments of the present disclosure.

It should be noted that the thickness of the second active portion 22 in the second direction y and the thickness of the third active portion 23 in the second direction y may be the same or different. The embodiments of the present disclosure are only described by using the thicknesses of the second active portion 22 and the third active portion 23 in the second direction y being the same as an example, so that the symmetry of the internal structure of the transistor is improved, and thus the process difficulty and the complexity are reduced.

In conclusion, according to the technical scheme of the embodiments of the present disclosure, the active layer in the channel region is disposed to include the first active portion, the second active portion and the third active portion, the second active portion and the third active portion are located on the two opposite sides of the first active portion in the first direction, and the second active portion is communicated with the source region in the active layer, and the third active portion is communicated with the drain region in the active layer; the thickness of at least part of the first active portion in the second direction is greater than the thickness of the second active portion in the second direction and greater than the thickness of the third active portion in the second direction. On one hand, a light distance of incident light in the channel region can be increased by utilizing the first active portion with a larger thickness, the residence time is prolonged, and further the absorption of light by the transistor is enhanced. On the other hand, the modulation effect of the gate electrode on the electrical performance of the channel region can be ensured by utilizing the second active portion and the third active portion with a thinner thickness, and the electrical performance of the transistor is ensured, so that the problem that an existing planar active layer cannot give consideration to both the electrical performance and the photoelectric induction capability of the transistor can be solved; the absorption of light by the transistor is enhanced and thus the photoelectric induction capability of the transistor is improved while ensuring the electrical performance of the transistor.

On the basis of the above embodiments, several feasible implementations are provided below for the specific structure of the active layer 2 in the transistor.

Figure 4:
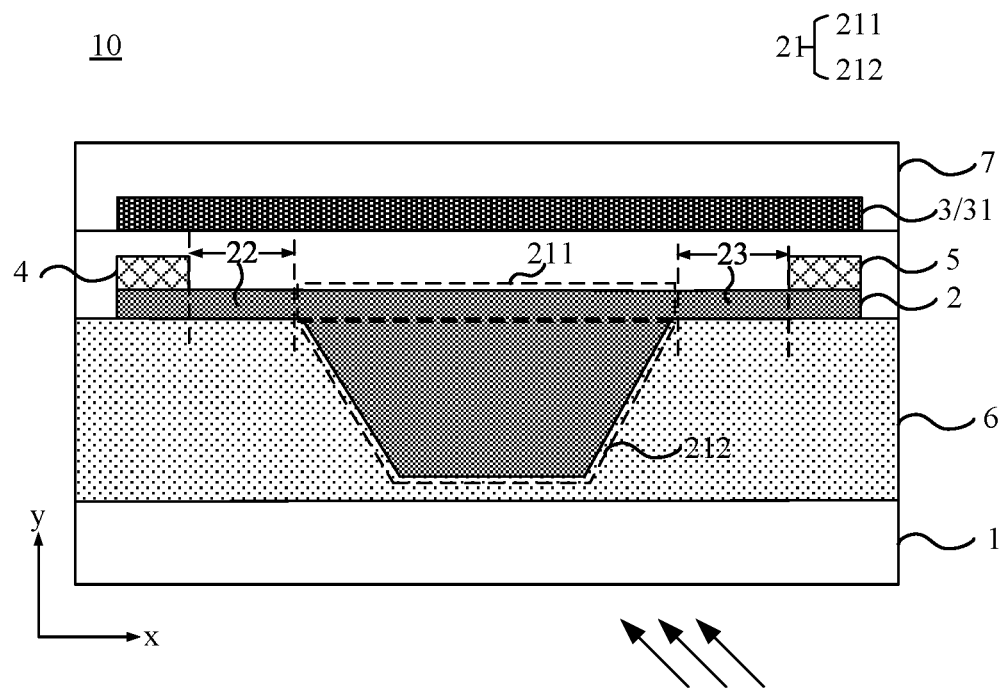
FIG. 4 is a cross-sectional view of another transistor provided in an embodiment of the present disclosure.

As a first feasible implementation, FIG. 4 is a cross-sectional view of another transistor provided in an embodiment of the present disclosure, as shown in FIG. 4, the first active portion 21 includes a first active sub-portion 211 and a second active sub-portion 212, the first active sub-portion 211, the second active portion 22 and the third active portion 23 are located on a same level in the second direction y; the second active sub-portion 212 is communicated with the first active sub-portion 211 and is located on a side of the first active sub-portion 211 facing the substrate 1.

Referring to FIG. 4, the first active sub-portion 211, the second active portion 22 and the third active portion 23 are located on a same level, it should be understood that the first active sub-portion 211 has the same thickness as the second active portion 22 and the third active portion 23, upper surfaces of the first active sub-portion 211, the second active portion 22 and the third active portion 23 in the second direction y are located on a same plane, and lower surfaces of the first active sub-portion 211, the second active portion 22 and the third active portion 23 in the second direction y are also located on a same plane.

Further, the second active sub-portion 212 is communicated with the first active sub-portion 211 and is located on a side of the first active sub-portion 211 facing the substrate 1, whereby the thickness of the first active portion 21 is greater than the thickness of the second active portion 22 and greater than the thickness of the third active portion 23, so that the absorption capacity of light by the transistor is improved and thus the photoelectric induction capability of the transistor is improved while ensuring the electrical performance of the transistor.

Figure 5:
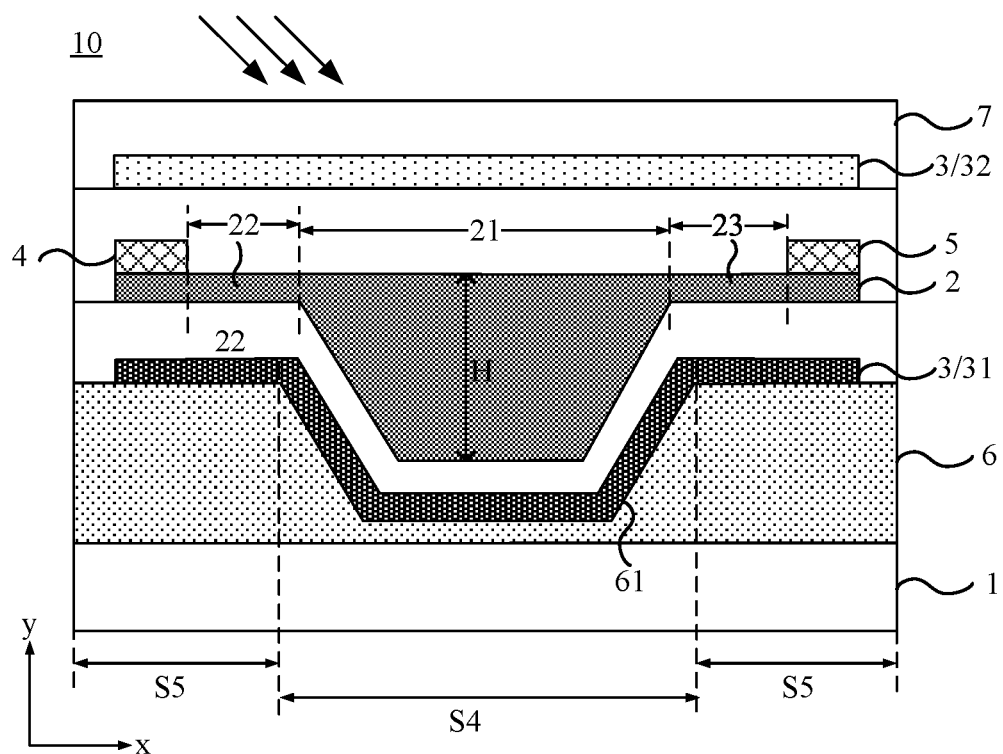
FIG. 5 is a cross-sectional view of another transistor provided in an embodiment of the present disclosure.

In comparison of FIG. 2 and FIG. 4, the difference is only in an arrangement position of the gate electrode 3. Specifically, referring to FIG. 2, the gate electrode 3 is located on a side of the active layer 2 facing the substrate 1 and is disposed to be insulated from the active layer 2, whereby a bottom-gate transistor may be formed. Referring to FIG. 4, the gate electrode 3 is located on a side of the active layer 2 facing away from the substrate 1 and is disposed to be insulated from the active layer 2, whereby a top-gate transistor may be formed. Moreover, FIG. 5 is a cross-sectional view of another transistor provided in an embodiment of the present disclosure, and as shown in FIG. 5, the transistor 10 includes two gate electrodes 3, namely, a first gate electrode 31 and a second gate electrode 32, the first gate electrode 31 and the second gate electrode 32 are respectively located on two opposite sides of the active layer 2, the first gate electrode 31 and the second gate electrode 32 are disposed to be insulated from the active layer 2, an orthographic projection of the first gate electrode 31 on the substrate 1 overlaps an orthographic projection of the channel region S3 on the substrate 1, and an orthographic projection of the second gate electrode 32 on the substrate 1 overlaps an orthographic projection of the channel region S3 on the substrate 1, whereby a double-gate transistor may be formed. The double-gate transistor may adjust a working voltage range of the transistor, has the threshold voltage regulation and control capability superior to that of a single-gate transistor, has low dark-state leakage current and high photosensitivity, and is a good choice of phototransistors. Since the orthographic projection of the gate electrode 3 on the substrate 1 overlaps the orthographic projection of the channel region S3 on the substrate 1, at least one gate electrode 3 should be set as a light-transmitting electrode for the double-gate transistor to ensure that light may enter the active layer 2.

Further, when the transistor 10 has a light-tight gate electrode, it is possible to further enhance the absorption effect of light by the transistor by means of matching an incident direction of light and an arrangement position of the light-tight gate electrode.

In an embodiment, referring to FIG. 2, when the transistor 10 includes a gate electrode 3, such as a first gate electrode 31, and the first gate electrode 31 is opaque to light, if light is incident into the transistor from the opposite side of the substrate 1 (three arrows in FIG. 2 indicate a direction of light propagation), the first gate electrode 31 is a metal electrode and is located between the active layer 2 and the substrate 1, an orthographic projection of the first gate electrode 31 on the substrate 1 overlaps the orthographic projection of the channel region S3 on the substrate 1. As described above, if light passes through the active layer 2 and is directed to a side of the substrate 1, since the first gate electrode 31 is the metal electrode, is opaque to light, and has a function of reflecting light, so that the light may be reflected back into the active layer 2 to further improve the absorption of light by the transistor. Further, referring to FIG. 5, the transistor 10 further includes a second gate electrode 32, the second gate electrode 32 is a light-transmitting electrode and is located on a side of the active layer 2 facing away from the first gate electrode 31, whereby a dual-gate transistor may be formed without affecting light incident into the transistor. Referring to FIG. 5, the drawings of the embodiments of the present disclosure use different filling modes for the light-transmitting gate electrode and the light-tight gate electrode to distinguish, which is not repeated later.

Further, referring to FIG. 4, when the transistor 10 includes a gate electrode 3, such as a first gate electrode 31, and the first gate electrode 31 is opaque to light, if light is incident into the transistor from a side of the substrate 1, the first gate electrode 31 is a metal electrode and is located on the side of the active layer 2 facing away from the substrate 1, an orthographic projection of the first gate electrode 31 on the substrate 1 overlaps an orthographic projection of the channel region S3 on the substrate 1. As described above, when light enters the transistor from a side of the substrate 1, and there is light passing through the active layer 2, since the first gate electrode 31 is the metal electrode, is opaque to light, and has a function of reflecting the light, so that the light may be reflected back into the active layer 2 to further increase the absorption of light by the transistor. Similarly, further, the transistor 10 further includes a second gate electrode 32, the second gate electrode 32 is a light-transmitting electrode and is located on a side of the active layer 2 facing away from the first gate electrode 31, i.e., the second gate electrode 32 is disposed between the active layer 2 and the substrate 1, whereby the dual-gate transistor may be formed without affecting light incident into the transistor.

In conclusion, when the transistor includes the light-tight gate electrode, the light-tight gate electrode may be the metal electrode and be disposed on a side of the active layer 2 facing away from a light incident surface of the transistor (such as, a side of the substrate or an opposite side of the substrate) to reflect light passing through the active layer 2 back to the active layer 2 to further improve the absorption of light by the transistor.

In conjunction with FIGS. 4 and 5, the transistor 10 further includes an insulating layer 6 located on a side of the active layer 2 facing the substrate 1, when the first active portion 21 includes the second active sub-portion 212, the insulating layer 6 includes a groove region S4 corresponding to the first active portion 21, and includes a non-groove region S5 surrounding the groove region S4; in the second direction y, a thickness of the insulating layer 6 in the groove region S4 is less than a thickness of the insulating layer 6 in the non-groove region S5. In other words, when the first active portion 21 includes the second active sub-portion 212, a segment difference is formed by providing a groove 61 (this groove 61 does not penetrate through the insulating layer 6) in the insulating layer 6 between the active layer 2 and the substrate 1, so that the second active sub-portion 212 is formed when the active layer 2 is prepared. In an embodiment, the insulating layer 6 may be a buffer layer, and the buffer layer may be a film layer formed by superposing silicon nitride and/or silicon oxide. It should be noted that a thickness of the insulating layer 6 in the groove region S4 is less than a thickness of the insulating layer 6 in the non-groove region S5, in particular, a thickness of the insulating layer 6 in the rest of the groove region S4 is less than a thickness of the insulating layer 6 in the non-groove region S5 except for the intersection of the groove region S4 and the non-groove region S5.

Figure 6:
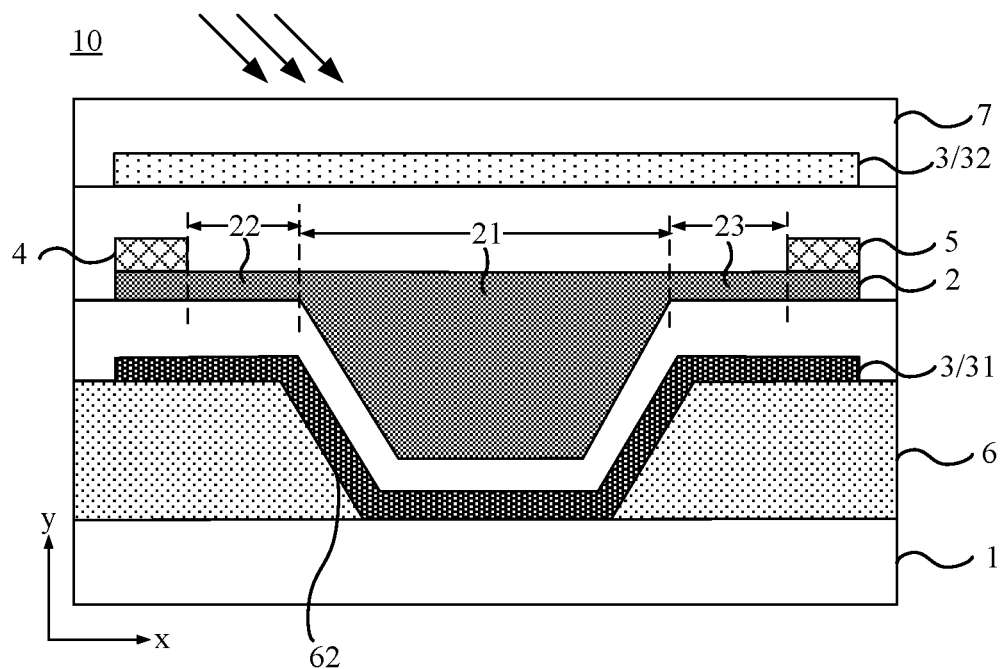
FIG. 6 is a cross-sectional view of another transistor provided in an embodiment of the present disclosure.

The processing manner of the insulating layer 6 shown in FIG. 5 is not limited, FIG. 6 is a cross-sectional view of another transistor provided in an embodiment of the present disclosure, in conjunction with FIG. 4 and FIG. 6, in other embodiments, when the first active portion 21 includes the second active sub-portion 212, the insulating layer 6 includes a digging hole 62 penetrating through the insulating layer 6, and an orthographic projection of the digging hole 62 on the substrate 1 overlaps an orthographic projection of the first active portion 21 on the substrate 1. In other words, a segment difference is formed by providing a digging hole 62 penetrating through the insulating layer 6 in the insulating layer 6 (such as, a buffer layer), so that the second active sub-portion 212 is formed when the active layer 2 is prepared. In a case where a maximum thickness of the insulating layer 6 is fixed, a digging hole 62 penetrating through the insulating layer 6 and corresponding to the first active portion 21 is provided in the insulating layer 6, and in comparison to providing the groove, the thickness of the second active sub-portion 212 in the second direction y may be larger, so that the optical distance of incident light in the channel region S3 may be further increased, the residence time of the incident light is prolonged, and the absorption of light by the transistor is improved. Moreover, in comparison to providing the groove in the insulating layer 6, the scheme of providing the digging hole 62 only needs to adjust the thickness of the insulating layer 6 according to the thickness of the second sub-active layer 2 and provide the digging hole 62 to penetrate through the insulating layer 6, so that the process is simpler.

Figure 7:
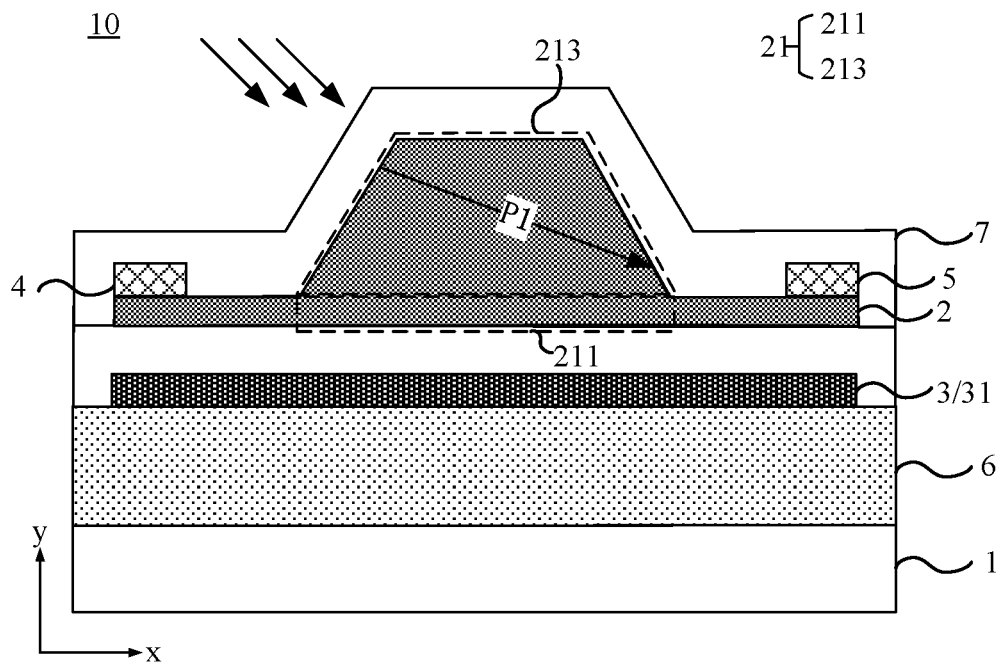
FIG. 7 is a cross-sectional view of another transistor provided in an embodiment of the present disclosure.

As another feasible implementation, FIG. 7 is a cross-sectional view of another transistor provided in an embodiment of the present disclosure, and as shown in FIG. 7, the first active portion 21 includes a first active sub-portion 211 and a third active sub-portion 213, and the first active sub-portion 211, the second active portion 22 and the third active portion 23 are located on a same level in the second direction y; the third active sub-portion 213 is communicated with the first active sub-portion 211 and is located on a side of the first active sub-portion 211 facing away from the substrate 1.

With this arrangement, the thickness of the first active portion 21 is also made larger than the thickness of the second active portion 22 and larger than the thickness of the third active portion 23, so that the absorption capacity of light by the transistor is improved and thus the photoelectric induction capability of the transistor is improved while ensuring the electrical performance of the transistor. In an embodiment, the third active sub-portion 213 may be formed by firstly forming a thicker active layer and then by thinning and patterning the active layer.

Further, in this embodiment, the above-described embodiments may be referred to for the provision of the gate electrode 3 in the transistor. Referring to FIG. 7, the transistor 10 further includes a first gate electrode 31 disposed to be insulated from the active layer 2; the first gate electrode 31 is a metal electrode and is located on a side of the active layer 2 facing the substrate 1, and an orthographic projection of the first gate electrode 31 on the substrate 1 overlaps the orthographic projection of the channel region S3 on the substrate 1. Moreover, referring to FIG. 4, the transistor further includes a first gate electrode 31 disposed to be insulated from the active layer 2; the first gate electrode 31 is the metal electrode and is located on a side of the active layer 2 facing away from the substrate 1, and the orthographic projection of the first gate electrode 31 on the substrate 1 overlaps the orthographic projection of the channel region S3 on the substrate 1. Further, referring to FIG. 5, the transistor includes a first gate electrode 31 and a second gate electrode 32, the first gate electrode 31 is a metal electrode, and the second gate electrode 32 is a light-transmitting electrode, the second gate electrode 32 is located on a side of the active layer 2 facing away from the first gate electrode 31 and having an orthographic projection on the substrate 1 that overlaps the orthographic projection of the channel region S3 on the substrate 1. As described above, in this arrangement, the first gate electrode 31 is opaque to light and has a light reflecting effect, light emitted through the active layer 2 may be reflected back to the active layer 2, the absorption of light by the transistor is further improved, and thus the photoelectric induction capability of the transistor is improved.

Figure 8:
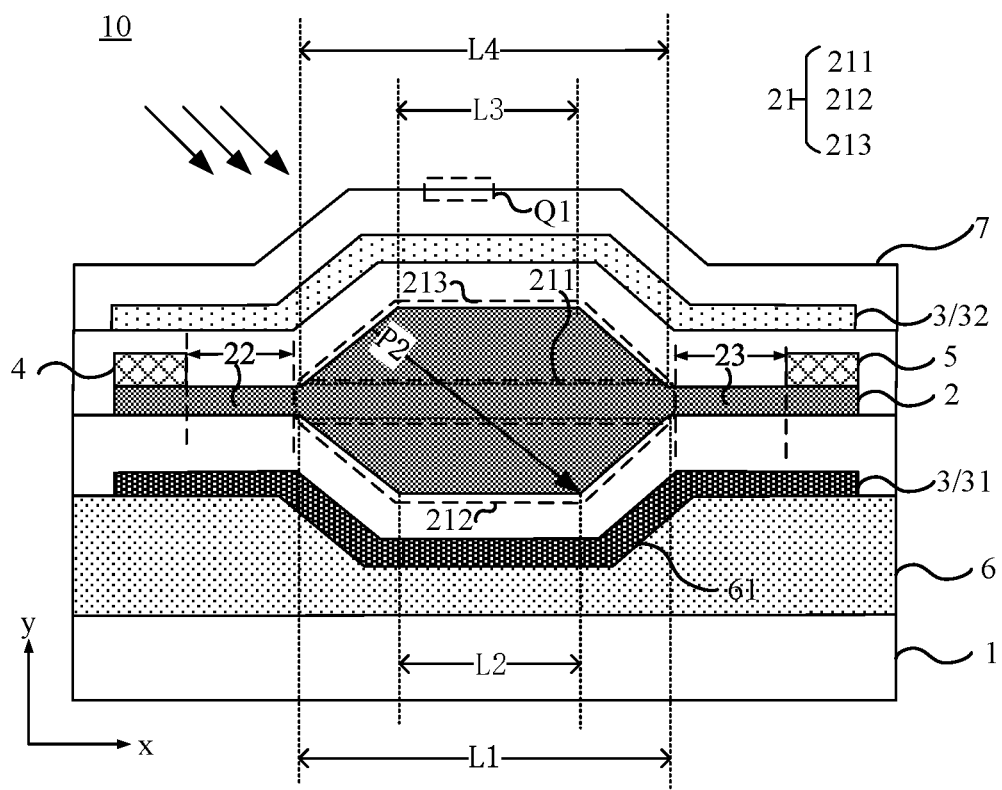
FIG. 8 is a cross-sectional view of another transistor provided in an embodiment of the present disclosure.

As another feasible implementation, FIG. 8 is a cross-sectional view of another transistor provided in an embodiment of the present disclosure, as shown in FIG. 8, the first active portion 21 includes a first active sub-portion 211, a second active sub-portion 212, and a third active sub-portion 213, the first active sub-portion 211, the second active portion 22 and the third active portion 23 are located on a same level in the second direction y; the second active sub-portion 212 is communicated with the first active sub-portion 211 and is located on a side of the first active sub-portion 211 facing the substrate 1; the third active sub-portion 213 is communicated with the first active sub-portion 211 and is located on a side of the first active sub-portion 211 facing away from the substrate 1.

In this embodiment, the first active portion 21 includes both a first active sub-portion 211, a second active sub-portion 212 and a third active sub-portion 213, and the second active sub-portion 212 and the third active sub-portion 213 are respectively located on two opposite sides of the first active sub-portion 211 in the second direction y. Comparing FIG. 7 (FIG. 4) and FIG. 8, in case of a constant thickness of the first active portion 21, providing the first active portion 21 including the first active sub-portion 211, the second active sub-portion 212, and the third active sub-portion 213 in this embodiment can make the sidewall climbing of the second active sub-portion 212 and the third active sub-portion 213 slower, and has less influence on the film formation coverage of the first gate electrode 31/the second gate electrode 32, and relatively lower process difficulty, compared to providing the first active portion 21 including the first active sub-portion 211 and the second active sub-portion 212 (the third active sub-portion 213). Moreover, referring to FIG. 7, P1 represents an optical distance of light rays vertically incident on the active layer 2 from a sidewall of the third active sub-portion 213, and referring to FIG. 8, P2 represents an optical distance of light rays vertically incident on the active layer 2 from the same position of a sidewall of the third active sub-portion 213. The inventor researches data to find that the design scheme of the active layer 2 shown in FIG. 8 can increase the optical distance of partial light rays (P2>P1) compared with the design scheme of the active layer 2 shown in FIG. 7, which is beneficial to sufficient absorption of light.

Further, referring to FIG. 8, in the first direction x, a length L1 of a side of the second active sub-portion facing away from the substrate 1 is greater than a length L2 of a side of the second active sub-portion 212 facing the substrate 1, and a length L3 of a side of the third active sub-portion 213 facing away from the substrate 1 is less than a length L4 of a side of the third active sub-portion 213 facing the substrate 1. With the arrangement, the process realization difficulty is low, in addition, the film forming property of the first gate electrode 31 and the second gate electrode 32 is facilitated, and the wire breaking risk of the first gate electrode 31 and the second gate electrode 32 is reduced. It should be noted that when the first active portion 21 includes only one of the second active sub-portion 212 and the third active sub-portions 213 (as in FIG. 4 and FIG. 7), it is also possible to dispose in this way.

It should also be noted that FIG. 8 illustrates only an example of the transistor 10 including the first gate electrode 31 and the second gate electrode 32, the first gate electrode 31 and the second gate electrode 32 being located on two opposite sides of the active layer 2, respectively, and the first gate electrode 31 being a light-tight metal electrode and the second gate electrode 32 being a light-transmitting electrode. Referring to the above-described embodiments, the transistor 10 may include only the first gate electrode 31, the first gate electrode 31 may be located between the active layer 2 and the substrate 1, or may be located on a side of the active layer 2 facing away from the substrate 1; when the first gate electrode 31 is the light-tight metal electrode, a position of the first gate electrode 31 may be set in combination with the light incident direction of the transistor, so that the absorption effect of light by the transistor is improved by utilizing the reflection of the first gate electrode 31 to the light, and the details are not repeated here.

Figure 9:
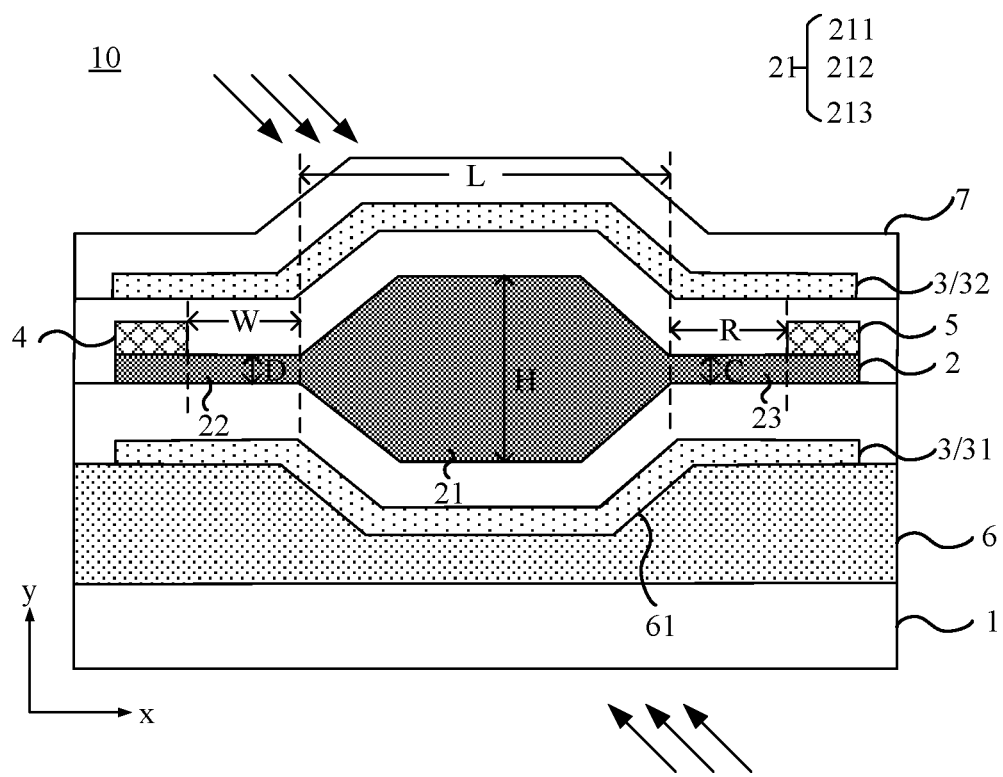
FIG. 9 is a cross-sectional view of another transistor provided in an embodiment of the present disclosure.

In conclusion, the above embodiments provide several feasible implementations for the specific structure of the active layer 2, and correspondingly illustrate feasible arrangements of the gate electrode 3. It should be noted that the above embodiments only exemplifies that the transistor 10 includes the light-tight gate electrode, and describes a preferred arrangement of the gate electrode, so as to achieve the effect of further improving the absorption of light by the transistor. Of course, this arrangement is not limiting, and since the present application provides that the thickness of the first active sub-section 21 is larger than the thickness of the second active sub-section 22 and is larger than the thickness of the third active sub-section 23, the absorption of light by the transistor can be effectively improved compared to an existing planar active layer, and therefore, in other embodiments, whether the transistor includes several gate electrodes, the gate electrode in the transistor may also use the light-transmitting electrode. In an embodiment, FIG. 9 is a cross-sectional view of another transistor provided in an embodiment of the present disclosure, and as shown in FIG. 9, the transistor 10 includes a first gate electrode 31 and a second gate electrode 32, the first gate electrode 31 and the second gate electrode 32 are disposed on two opposite sides of the active layer 2 in the second direction y and are disposed to be insulated from the active layer 2; the first gate electrode 31 and the second gate electrode 32 are both light transmitting electrodes. In that case, light may enter the transistor from either the side of the substrate 1 or the opposite side of the substrate 1.

Based on the above embodiment, the dimensions of the active layer 2 within the channel region S3 are further described below. Referring to FIG. 9, the thickness H of the first active portion 21 in the second direction y is in the range of 470 nm to 1150 nm, and a thickness D of the second active portion 22 in the second direction y and a thickness C of the third active portion 23 in the second direction y are each in the range of 70 nm to 150 nm. In an embodiment, D=C.

It is firstly noted that in this embodiment, a thickness H of the first active portion 21 specifically refers to the distance between a surface of a side of the first active portion 21 furthest from the substrate 1 and a surface of a side of the first active portion 21 closest to the substrate 1, and it should be understood that a thickness range at the side wall of the first active portion 21 in the second direction y is between D and H. Similarly, the thickness D of the second active portion 22 specifically refers to a distance between a surface of a side of the second active portion 22 furthest from the substrate 1 and a surface of a side of the second active portion 22 closest to the substrate 1, and the thickness D of the third active portion 23 specifically refers to a distance between a surface of a side of the third active portion 23 furthest from the substrate 1 and a surface of a side of the third active portion 23 closest to the substrate 1.

When the thickness of the first active portion 21 in the second direction y is too small, the transistor has a limited effect of improving the absorption of light, when the thickness of the first active portion 21 in the second direction y is increased, the absorption of light by the transistor gradually tends to be saturated, too much increase of the thickness of the first active portion 21 is limited to further improve the absorption effect of light by the transistor, and the overall thickness and manufacturing difficulty of the transistor are increased, so that the thickness of the first active portion 21 is not suitable to be too large, the above problems may be avoided by setting the thickness of the first active portion 21 in the second direction y to be 470 nm to 1150 nm, the light distance of incident light in the channel region S3 is increased by utilizing the thicker first active portion 21, the residence time of the incident light is prolonged, and the absorption of light by the transistor is effectively improved. Moreover, in this embodiment, the thickness of each of the second active portion 22 and the third active portion 23 in the second direction y is set to be 70 nm to 150 nm, the electrical modulation effect of the gate electrode 3 on the channel region S3 can be ensured through the thinner second active portion 22 and the thinner third active portion 23, and it is ensured that the transistor may be normally turned on and off.

In an embodiment, when the first active portion 21 includes a first active sub-portion 211, a second active sub-portion 212 and a third active sub-portion 213, a thickness of the first active sub-portion 211 in the second direction y is 70 nm to 150 nm, i.e. the first active sub-portion 211 has the same thickness as the second active portion 22 of the same level, the thickness of the second active sub-portion 212 in the second direction y and the thickness of the third active sub-portion 213 in the second direction y may be both 200 nm~500 nm, and when the thickness of the second active sub-portion 212 in the second direction y and the thickness of the third active sub-portion 213 in the second direction y are equal, the symmetry of the active layer 2 may be improved, so that the light vertically incident from a side wall of the second sub-active layer 212 can reach an opposite side wall of the third active sub-portion 213 (referring to the light distance shown as the light path P2 shown in FIG. 8), so that an average light distance of the light in the active layer 2 may be increased to a certain extent, and the absorption of light by the transistor is further enhanced.

With continued reference to FIG. 9, a length L of the first active portion 21 in the first direction x is at least 5 μm.

The length L of the first active portion 21 in the first direction x specifically refers to a maximum length of the first active portion 21 in the first direction x, or to a distance between the boundary position of the first active portion 21 and the second active portion 22 and the boundary position of the first active portion 21 and the third active portion 23. The length of the first active portion 21 in the first direction x is set to be at least 5 μm, it can be ensured that incident light has a large optical distance in the channel region S3 in the first direction x, the residence time of the incident light in the channel region S3 is prolonged, and the absorption of light by the transistor is enhanced. Of course, a length of the first active portion 21 in the first direction x has an upper limit and may be specifically set according to a total length of the channel region S3 in the first direction x, and the length of the first active portion 21 in the first direction x can be increased as much as possible without affecting the modulation effect of the gate on the electrical properties of the channel region S3.

With continued reference to FIG. 9, a length W of the second active portion 22 in the first direction x and a length R of the third active portion 23 in the first direction x are each in the range of 5 μm to 15 μm. In an embodiment, W=R.

When the lengths of the second active portion 22 and the third active portion 23 in the first direction x are too short, on one hand, the modulation effect of the gate electrode 3 on the electrical performance of the channel region S3 is greatly weakened, and on the other hand, the source electrode 4 and the drain electrode 5 may be in contact with the thicker first active portion 21; therefore, carriers which are not regulated and controlled by the gate electrode 3 in a region where the first active portion 21 is located enter the source electrode 4 and the drain electrode 5, normal switching characteristics of the transistor are affected, and therefore the lengths of the second active portion 22 and the third active portion 23 in the first direction x are not suitable to be too short. When the second active portion 22 and the third active portion 23 have a certain length, the modulation effect of the gate electrode 3 on the electrical performance of the channel may be ensured, and if the length of the second active portion 22/the third active portion 23 in the first direction x continues to be increased on this basis, the modulation effect of the gate electrode 3 on the electrical performance of the channel region S3 is difficult to improve greatly. Moreover, in a case of a constant length of the channel region S3 in the first direction x, the length of the first active portion 21 in the first direction x is also compressed, so the lengths of the second active portion 22 and the third active portion 23 in the first direction x are not suitably too long. According to the embodiments of the present disclosure, the lengths of the second active portion 22 and the third active portion 23 in the first direction x are 5 μm to 15 μm, at least the modulation effect of the gate electrode 3 on the electrical performance of the channel can be ensured, and meanwhile, in a case where the length of the channel region S3 in the first direction x is fixed, the length of the first active portion 21 in the first direction x can be prevented from being excessively compressed, and the absorption capability of light by the transistor is ensured.

It should be noted that when the length of the channel region S3 in the first direction x is long or not limited, the lengths of the first active portion 21, the second active portion 22, and the third active portion 23 in the first direction x may be set according to actual requirements as long as the above-mentioned lower limit length is satisfied, that is, the length of the first active portion 21 in the first direction x is at least 5 μm, the length of the second active portion 22 in the first direction x is at least 5 μm, the length of the third active portion 23 in the first direction x is at least 5 μm, and a sum of the lengths of the first active portion 21, the second active portion 22 and the third active portion 23 in the first direction x is the length of the channel region S3 in the first direction x.

Figure 10:
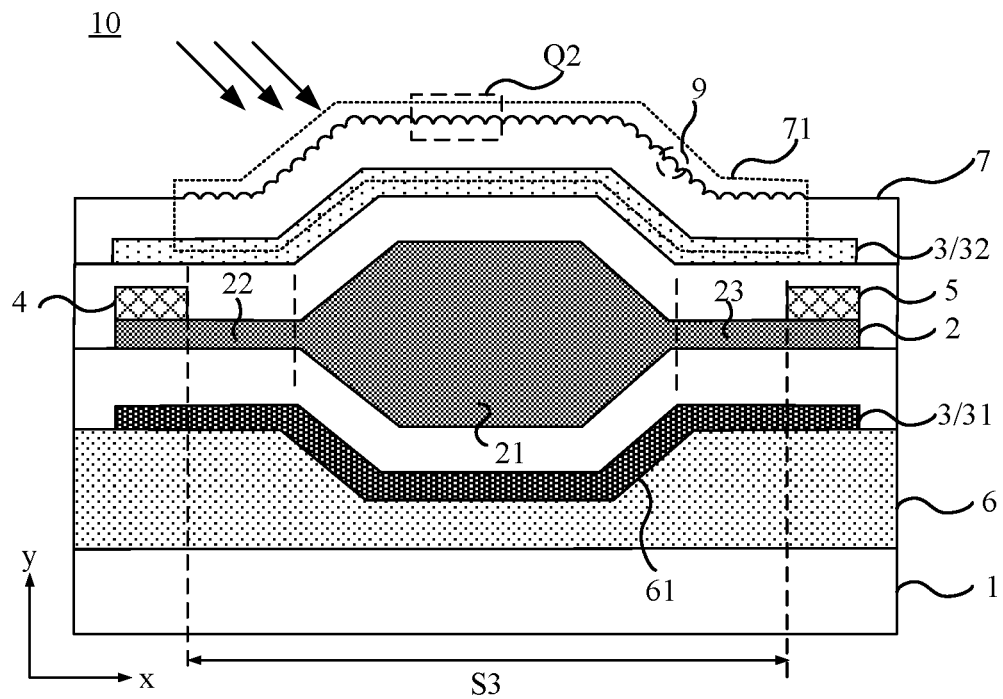
FIG. 10 is a cross-sectional view of another transistor provided in an embodiment of the present disclosure.

On the basis of any one of the above embodiments, FIG. 10 is a cross-sectional view of another transistor provided in an embodiment of the present disclosure, as shown in FIG. 10, the transistor 10 further includes an encapsulation layer 7 located on a side of the active layer 2 facing away from the substrate 1, the encapsulation layer 7 includes a first encapsulation portion 71, the first encapsulation portion 71 covers the channel region S3 in the second direction y, and in the encapsulation layer, at least a surface of a side of the first encapsulation portion 71 facing away from the substrate 1 includes multiple convex structures 9 which are convex in a direction facing away from the active layer 2.

In an optical detection in the fields of biomedicine and the like, tests are usually performed in liquid, and the refractive index of the liquid may be greater than that of the encapsulation layer 7, at this time, on a surface of a side of the encapsulation layer 7 facing away from the substrate 1, part of light rays are totally reflected due to a fact that the part of light rays meet the total reflection condition and cannot be emitted into the transistor to be absorbed by the active layer 2, and therefore incident light loss is caused, and thus the photoelectric induction capability of the transistor is affected. To this end, according to this embodiment, at least a surface of a side of the first encapsulation portion 71 facing away from the substrate 1 includes multiple convex structures 9 which are convex in a direction facing away from the active layer 2, so that an incident angle of at least part of light rays may be reduced, the incident light loss caused by the total reflection is reduced, the amount of light emitted into the active layer 2 is ensured, and thus the absorption of light by the transistor is ensured.

Figure 11:
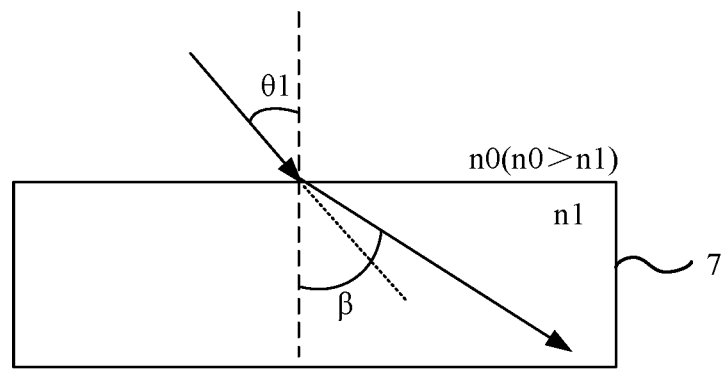
FIG. 11 is an enlarged view of a region Q1 in FIG. 8.
Figure 12:
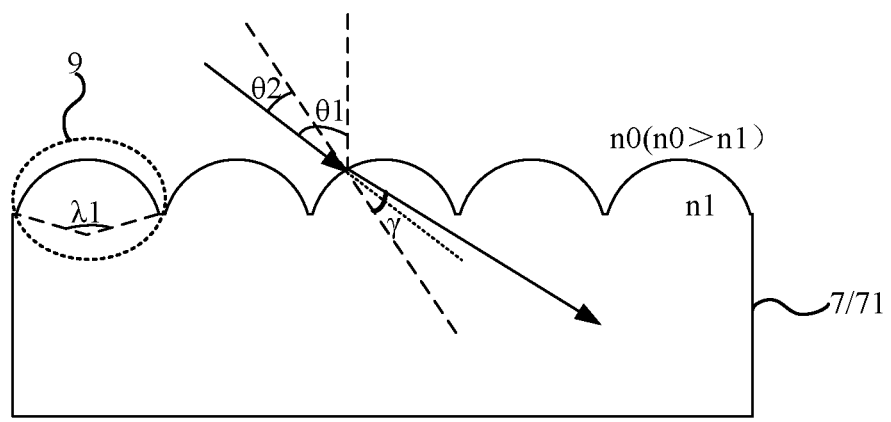
FIG. 12 is an enlarged view of a region Q2 in FIG. 10.

In an embodiment, FIG. 11 is an enlarged view of a region Q1 in FIG. 8, showing an optical path when a surface of a side of the encapsulation layer 7 facing away from the substrate 1 is planar, and FIG. 12 is an enlarged view of a region Q2 in FIG. 10, showing an optical path when a surface of a side of the first encapsulation portion 71 facing away from the substrate 1 includes multiple convex structures 9, in FIGS. 11 and 12, a refractive index n0 of the ambient medium is greater than a refractive index n1 of the encapsulation layer. As can be seen by comparing FIG. 11 with FIG. 12, compared with a fact that a surface of a side of the first encapsulation portion 71 facing away from the substrate 1 is planar (the side wall is an inclined plane), in this embodiment, the surface of the side of the first encapsulation portion 71 facing away from the substrate 1 includes the multiple convex structures 9, so that a light incidence angle θ2 of the latter (FIG. 12) is less than a light incidence angle θ1 of the former (FIG. 11); therefore, at least part of light which is originally totally reflected may be refracted to enter the transistor because of not satisfying the total reflection condition, whereby the incident light loss caused by the total reflection is reduced, and the light quantity of the incident light is ensured. Moreover, with continued reference to FIGS. 11 and 12, according to the law of refraction, a refraction angle γ of the latter (FIG. 12) is less than a refraction angle β of the former (FIG. 11), and therefore, compared with the surface of the side of the first encapsulation portion 71 facing away from the substrate 1 is planar, in the embodiments of the present disclosure, the surface of the side of the first encapsulation portion 71 facing away from the substrate 1 includes the multiple convex structures 9, so that a deflection degree of light may be smaller, the light gathering effect is achieved, the probability of total reflection of the light on other film interfaces is reduced, and the amount of light incident to the channel region S3 is ensured.

It should be noted that FIG. 10 is illustrated only by using an example in which the surface of the side of the first encapsulation portion 71 facing away from the substrate 1 is provided with the convex structures 9 that are convex towards the side facing away from the substrate 1, and this arrangement is not limiting, in other embodiments, the surface of the side of the whole encapsulation layer 7 facing away from the substrate 1 may be provided with the convex structure 9. By means of the arrangement, the process difficulty and the complexity can be reduced, and the requirement for the process precision is reduced.

As described above, the light may also be injected into the transistor from the side of the substrate 1, and at this time, the design of the convex structure 9 may be made with respect to the incident surface of the side of the substrate 1.

Figure 13:
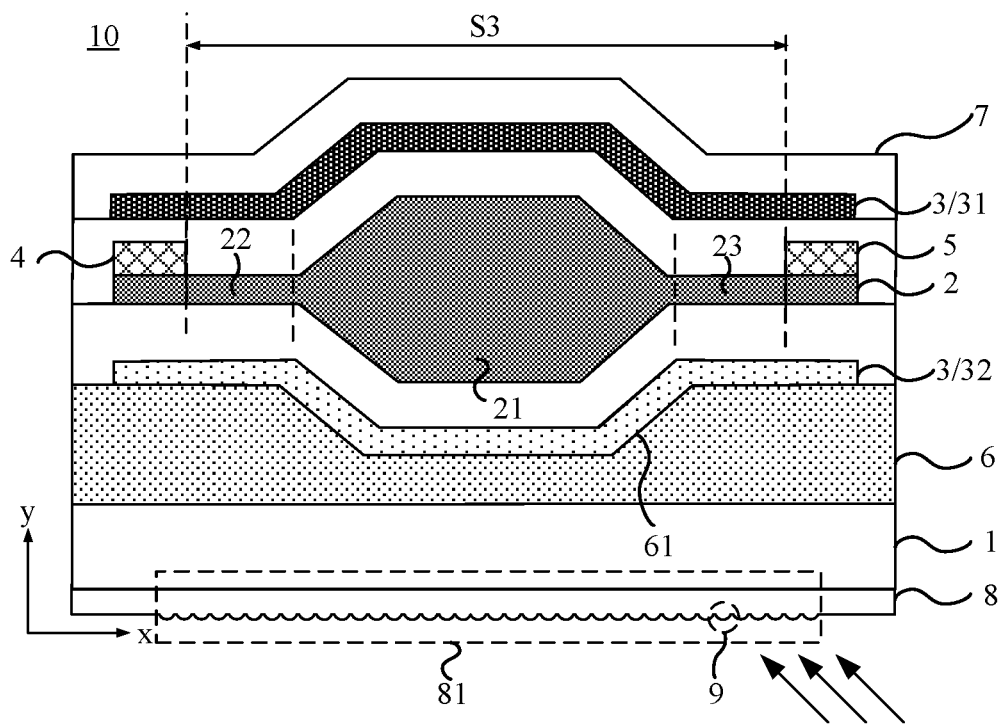
FIG. 13 is a cross-sectional view of another transistor provided in an embodiment of the present disclosure.

As a feasible implementation, FIG. 13 is a cross-sectional view of another transistor provided in an embodiment of the present disclosure, as shown in FIG. 13, the substrate 1 is a rigid substrate 1, and the transistor 10 further includes a light adjustment layer 8 located on a side of the rigid substrate 1 facing away from the active layer 2; the light adjustment layer 8 includes a first light adjustment portion 81, and the first light adjustment portion 81 covers the channel region S3 in the second direction y; in the light adjustment layer 8, at least the surface of a side of the first light adjustment portion 81 facing away from the rigid substrate 1 includes multiple convex structures 9 which are convex in a direction facing away from the active layer 2. As the rigid substrate 1 is difficult to process, a light adjustment layer 8 may be disposed on a side of the rigid substrate 1 facing away from the active layer 2, and multiple convex structures 9 are disposed on at least a surface of a side, facing away from the substrate 1, of a first light adjustment portion 81 corresponding to the channel region S3, so that light is emitted from a side of the substrate 1, and when the refractive index of the light adjustment layer 8 is less than the refractive index of the environment medium, the phenomenon of total reflection of the light on the light incident surface is reduced, and meanwhile, the effect of gathering the light is achieved, the amount of the light incident into the channel region S3 is ensured, and the specific principle is not repeated here. In an embodiment, the light adjustment layer 8 may be made of flexible polyimide (PI).

Figure 14:
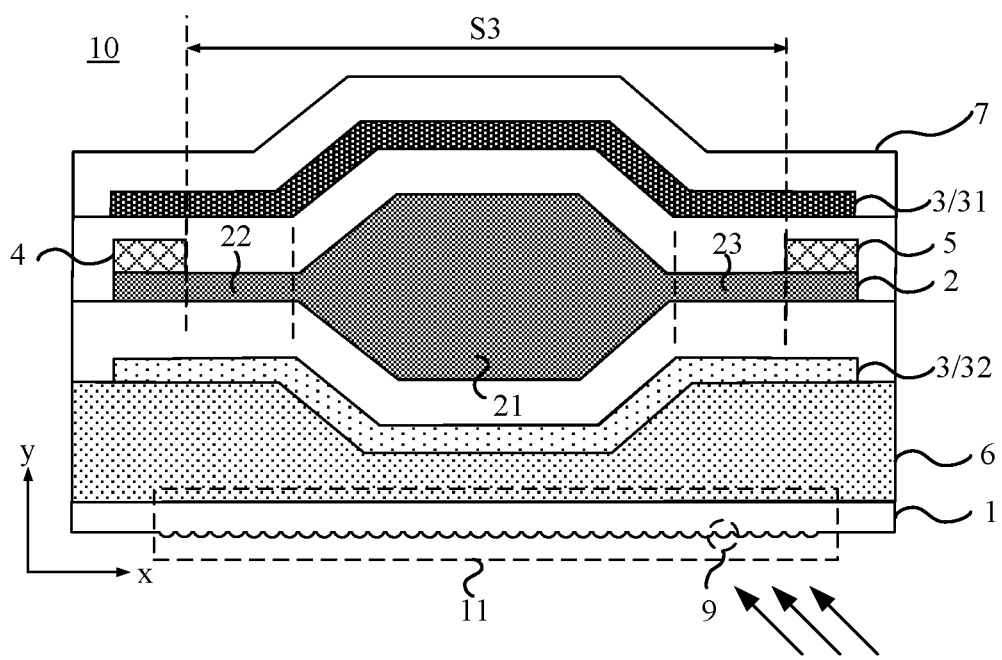
FIG. 14 is a cross-sectional view of another transistor provided in an embodiment of the present disclosure.

As another feasible implementation, FIG. 14 is a cross-sectional view of another transistor provided in an embodiment of the present disclosure, as shown in FIG. 14, the optional substrate 1 is a flexible substrate including a first substrate portion 11, the first substrate portion 11 covers the channel region S3 in the second direction y; in the flexible substrate, at least a surface of a side of the first substrate portion 11 facing away from the active layer 2 includes multiple convex structures 9 which are convex in the direction facing away from the active layer 2. Specifically, when the substrate 1 is a flexible substrate, multiple convex structures 9 may be directly disposed on a surface of a side of the flexible substrate facing away from the active layer 2, and at least on a surface of a side of the first substrate portion 11 corresponding to the channel region S3 facing away from the active layer 2, so that when light enters from a side of the substrate 1 and the refractive index of the flexible substrate is less than that of an environmental medium, a phenomenon that light rays are totally reflected at the incident surface is reduced, and meanwhile, the effect of converging the light rays is achieved, and the amount of the light emitted into the channel region S3 is ensured. In an embodiment, the flexible substrate may employ flexible polyimide (PI).

It should be noted that FIG. 10, FIG. 13 and FIG. 14 are illustrated only by using an example in which the cross-sectional shape of the convex structure 9 in a cross-section perpendicular to a plane where the substrate 1 is located is circular arc, and this arrangement is not limiting, in other embodiments, in the cross-section perpendicular to the plane where the substrate 1 is located, the cross-sectional shape of the convex structure 9 may be elliptical arc or zigzag, the elliptical arc and zigzag convex structures 9 can also achieve the above effects, and those skilled in the art may set the shape of the convex structures 9 as required, which is not limited in the embodiments of the present disclosure.

Figure 15:
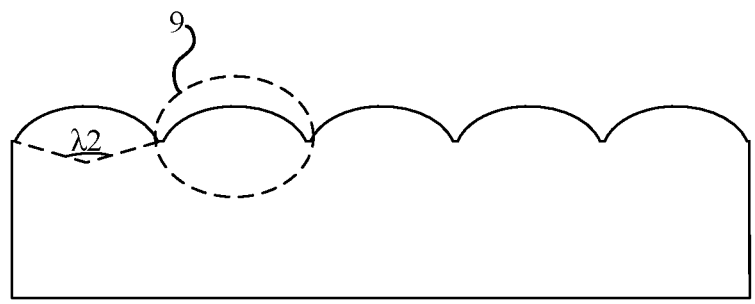
FIG. 15 is a schematic cross-sectional view of a partially convex structure of a transistor provided in an embodiment of the present disclosure.
Figure 16:
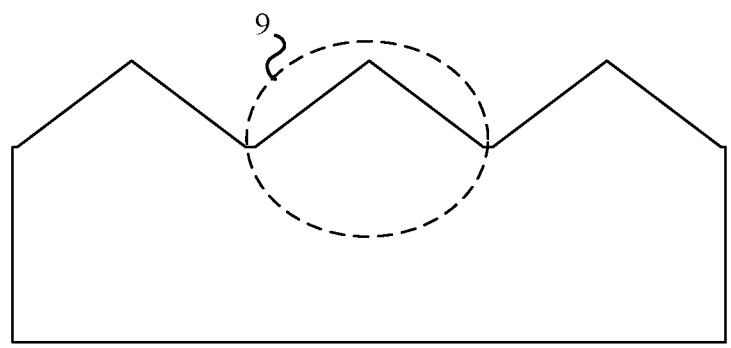
FIG. 16 is a schematic cross-sectional view of a partially convex structure of another transistor provided in an embodiment of the present disclosure.
Figure 17:
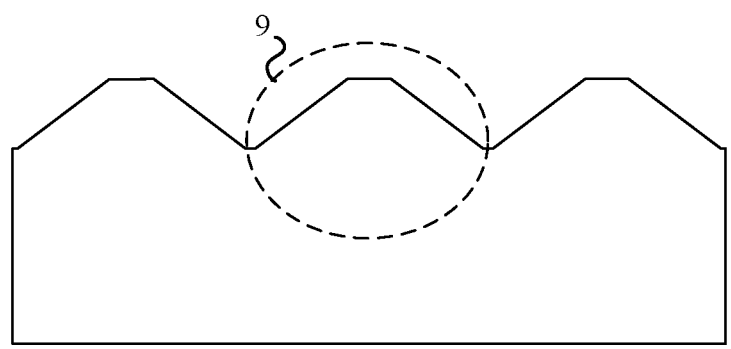
FIG. 17 is a schematic cross-sectional view of a partially convex structure of another transistor provided in an embodiment of the present disclosure.

In an embodiment, FIG. 15 is a schematic cross-sectional view of a partially convex structure of a transistor provided in an embodiment of the present disclosure, and FIG. 15 shows a structure in which a cross-sectional shape of the convex structure 9 in a cross-section perpendicular to a plane in which the substrate 1 is located is elliptical. FIG. 16 is a schematic cross-sectional view of a partially convex structure of another transistor provided in an embodiment of the present disclosure, FIG. 17 is a schematic cross-sectional view of a partially convex structure of another transistor provided in an embodiment of the present disclosure, and FIGS. 16 and 17 show a structure in which a cross-sectional shape of the convex structure 9 in a cross-section perpendicular to a plane in which the substrate 1 is located is zigzag.

Further, when the cross-sectional shape of the convex structure 9 is circular arc (as shown in FIG. 12) or elliptical arc (as in FIG. 15), the radian λ1 of the circular arc or the radian λ2 of the elliptical arc is less than or equal to π For an arc-shaped incident surface and an elliptical arc incident surface, the incident positions of incident light are different, the extension directions of the normal are different, and if the radian of the circular arc or the elliptical arc is greater than π, part of the light may be incident on the surface below the center of the arc/elliptic arc, so that the included angle (i.e. incident angle) between the incident light and the normal is large, resulting in total reflection of the light and failure of the light to enter the transistor. Therefore, in order to effectively reduce the phenomenon that the light rays are totally reflected on the incident surface, the radian of the circular arc or the elliptical arc is set to be less than or equal to π in the embodiments of the present disclosure.

Based on the same inventive concept, an embodiment of the present disclosure further provides a photoelectric sensor including the transistor provided in any of the above embodiments, and thus has the same beneficial effects as the above-described transistor, and the same may be referred to the description of the above transistor embodiments and will not be repeated here. In an embodiment, the photoelectric sensor provided in the embodiments of the present disclosure may be applied to a display device such as a mobile phone to realize the touch function. Specifically, an illumination intensity of the position touched by the finger is different from an illumination intensity of the position not touched by the finger, so that the detection of the touch position can be realized through the induction of the transistor arranged in the mobile phone to the illumination, and the touch control function is further realized. Of course, the photoelectric sensor provided in the embodiments of the present disclosure may also be applied to other fields requiring photoelectric sensing, which is not specially limited in the embodiments of the present disclosure.

The above-described specific implementations should not be construed as limiting the scope of protection of the present disclosure. It should be understood by those skilled in the art that various modifications, combinations, sub-combinations and substitutions may be made depending on design requirements and other factors. Any modification, equivalent replacement, and improvement made within the spirit and principle of the present disclosure should be included in the scope of protection of the present disclosure.

What is claimed is:

1. A transistor, comprising a substrate and an active layer located on a side of the substrate;
wherein the active layer comprises a source region, a drain region and a channel region located between the source region and the drain region, and in the channel region, the active layer comprises a first active portion, a second active portion and a third active portion, the second active portion and the third active portion are respectively located on two opposite sides of the first active portion in a first direction, the second active portion is communicated with the source region in the active layer, and the third active portion is communicated with the drain region in the active layer, a thickness of at least part of the first active portion in a second direction is greater than a thickness of the second active portion in the second direction and greater than a thickness of the third active portion in the second direction; and
wherein the first direction is parallel to a direction in which the source region points to the drain region, and the second direction is perpendicular to a top surface of the substrate,
wherein the first active portion comprises a first active sub-portion, the first active sub-portion, the second active portion, and the third active portion are located on a same level in the second direction;
the first active portion further comprises at least one of:
a second active sub-portion, which is communicated with the first active sub-portion and is located on a side of the first active sub-portion facing the substrate; or
a third active sub-portion, which is communicated with the first active sub-portion and is located on a side of the first active sub-portion facing away from the substrate.

2. The transistor of claim 1, wherein the first active portion comprises the second active sub-portion; and
wherein the transistor further comprises an insulating layer located on a side of the active layer facing the substrate, the insulating layer comprises a groove region corresponding to the first active portion and a non-groove region surrounding the groove region; and in the second direction, a thickness of the insulating layer in the groove region is less than a thickness of the insulating layer in the non-groove region.

3. The transistor of claim 1, wherein the first active portion comprises the second active sub-portion; and
wherein the transistor further comprises an insulating layer located on a side of the active layer facing the substrate, the insulating layer comprises a digging hole penetrating through the insulating layer, and an orthographic projection of the digging hole on the substrate overlaps an orthographic projection of the first active portion on the substrate.

4. The transistor of claim 1, wherein in the first direction, a length of a side of the second active sub-portion facing away from the substrate is greater than a length of a side of the second active sub-portion facing the substrate, and a length of a side of the third active sub-portion facing away from the substrate is less than a length of a side of the third active sub-portion facing the substrate.

5. The transistor of claim 1, wherein a thickness of the first active portion in the second direction is 470 nm to 1150 nm, and a thickness of each of the second active portion and the third active portion in the second direction is 70 nm to 150 nm.

6. The transistor of claim 1, wherein a length of the first active portion in the first direction is at least 5 μm.

7. The transistor of claim 1, wherein the second active portion and the third active portion each have a length of 5 μm to 15 μm in the first direction.

8. The transistor of claim 1, further comprising a first gate electrode disposed insulated from the active layer;
the first gate electrode is a metal electrode and is located between the active layer and the substrate, and an orthographic projection of the first gate electrode on the substrate overlaps the orthographic projection of the channel region on the substrate.

9. The transistor of claim 1, further comprising a first gate electrode disposed insulated from the active layer; and
the first gate electrode is a metal electrode and is located on a side of the active layer facing away from the substrate, and an orthographic projection of the first gate electrode on the substrate overlaps an orthographic projection of the channel region on the substrate.

10. The transistor of claim 8, further comprising a second gate electrode disposed insulated from the active layer; and
wherein the second gate electrode is a light-transmitting electrode and is located on a side of the active layer facing away from the first gate electrode, and an orthographic projection of the second gate electrode on the substrate overlaps the orthographic projection of the channel region on the substrate.

11. The transistor of claim 9, further comprising a second gate electrode disposed insulated from the active layer; and
wherein the second gate electrode is a light-transmitting electrode and is located on a side of the active layer facing away from the first gate electrode, and an orthographic projection of the second gate electrode on the substrate overlaps the orthographic projection of the channel region on the substrate.

12. The transistor of claim 1, further comprising a first gate electrode and a second gate electrode, wherein the first gate electrode and the second gate electrode are disposed on two opposite sides of the active layer in the second direction and are disposed to be insulated from the active layer; and
the first gate electrode and the second gate electrode are both light-transmitting electrodes.

13. The transistor of claim 1, further comprising an encapsulation layer located on a side of the active layer facing away from the substrate, wherein the encapsulation layer comprises a first encapsulation portion, and the first encapsulation portion covers the channel region in the second direction; and
in the encapsulation layer, at least a surface of a side of the first encapsulation portion facing away from the substrate comprises a plurality of convex structures which are convex in a direction facing away from the active layer.

14. The transistor of claim 1, wherein the substrate is a rigid substrate, the transistor further comprises a light adjustment layer located on a side of the rigid substrate facing away from the active layer; the light adjustment layer comprises a first light adjustment portion, and the first light adjustment portion covers the channel region in the second direction; and
wherein in the light adjustment layer, at least a surface of a side of the first light adjustment portion facing away from the rigid substrate comprises a plurality of convex structures which are convex in a direction facing away from the active layer.

15. The transistor of claim 1, wherein the substrate is a flexible substrate comprising a first substrate portion, and the first substrate portion covers the channel region in the second direction; and wherein in the flexible substrate, at least a surface of a side of the first substrate portion facing away from the active layer comprises a plurality of convex structures which are convex in a direction facing away from the active layer.

16. The transistor of claim 13, wherein on a cross section perpendicular to a plane where the substrate is located, a cross-sectional shape of the convex structure is circular arc, elliptical arc or zigzag.

17. The transistor of claim 16, wherein a radian of the circular arc or a radian of the elliptical arc is less than or equal to π.

18. The transistor of claim 1, further comprising a source electrode and a drain electrode, wherein the source electrode is in contact with the source region in the active layer, and the drain electrode is in contact with the drain region in the active layer.

19. A photoelectric sensor, comprising a transistor,
wherein the transistor comprises a substrate and an active layer located on a side of the substrate;
wherein the active layer comprises a source region, a drain region and a channel region located between the source region and the drain region, and in the channel region, the active layer comprises a first active portion, a second active portion and a third active portion, the second active portion and the third active portion are respectively located on two opposite sides of the first active portion in a first direction, the second active portion is communicated with the source region in the active layer, and the third active portion is communicated with the drain region in the active layer, a thickness of at least part of the first active portion in a second direction is greater than a thickness of the second active portion in the second direction and greater than a thickness of the third active portion in the second direction; and
wherein the first direction is parallel to a direction in which the source region points to the drain region, and the second direction is perpendicular to a top surface of the substrate,
wherein the first active portion comprises a first active sub-portion, the first active sub-portion, the second active portion, and the third active portion are located on a same level in the second direction;
the first active portion further comprises at least one of:
a second active sub-portion, which is communicated with the first active sub-portion and is located on a side of the first active sub-portion facing the substrate; or
a third active sub-portion, which is communicated with the first active sub-portion and is located on a side of the first active sub-portion facing away from the substrate.

* * * * *